US012627545B2

(12) United States Patent
Tsuchida

(10) Patent No.: US 12,627,545 B2
(45) Date of Patent: May 12, 2026

(54) SYNCHRONIZATION DETECTION APPARATUS, SYNCHRONIZATION DETECTION METHOD, AND NON-TRANSITORY COMPUTER READABLE MEDIUM

(71) Applicant: JVCKENWOOD Corporation, Yokohama (JP)

(72) Inventor: Masayuki Tsuchida, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 39 days.

(21) Appl. No.: 18/969,390

(22) Filed: Dec. 5, 2024

(65) Prior Publication Data

US 2025/0097085 A1 Mar. 20, 2025

Related U.S. Application Data

(63) Continuation of application No. PCT/JP2023/019367, filed on May 24, 2023.

(30) Foreign Application Priority Data

Jun. 27, 2022 (JP) ................................. 2022-102550

(51) Int. Cl.
H04B 1/10 (2006.01)
H04L 7/027 (2006.01)
H04L 27/148 (2006.01)

(52) U.S. Cl.
CPC ............ *H04L 27/148* (2013.01); *H04L 7/027* (2013.01)

(58) Field of Classification Search
CPC . H04L 27/148; H04L 7/027; H04L 25/03006; H04W 56/005; H04B 1/70712;
(Continued)

(56) References Cited

U.S. PATENT DOCUMENTS 5,727,027 A 3/1998 Tsuda
5,784,403 A * 7/1998 Scott .................. H04B 1/70712
375/151

(Continued)

FOREIGN PATENT DOCUMENTS

JP H08251243 A 9/1996
JP 2007110269 A 4/2007
JP 2008035132 A 2/2008

OTHER PUBLICATIONS

International Search Report of PCT/JP2023/019367, dated Aug. 8, 2023, 4 pages.

*Primary Examiner* — Phuong Phu
(74) *Attorney, Agent, or Firm* — PROCOPIO, CORY, HARGREAVES & SAVITCH LLP

(57) ABSTRACT

Provided are a synchronization detection apparatus, a synchronization detection method, and a synchronization detection program that make it possible to follow, in a short time, a frequency deviation of an intermediate frequency after a radio frequency is down-converted. A synchronization detection apparatus according to the present invention includes: a band limitation unit in which, for an externally received signal, each of a plurality of filters each having a different center frequency limits a band of the received signal to output a plurality of band-limited signals; a detection and demodulation unit that detects and demodulates each of the plurality of band-limited signals to output a plurality of detected signals; and a synchronization detection unit that performs synchronization detection of each of the plurality of detected signals to output a plurality of correlation values.

4 Claims, 11 Drawing Sheets

(58) Field of Classification Search
CPC .... H04B 1/1661; H04B 1/123; H04B 1/7075;
H04B 1/40
USPC ........................ 375/350, 343, 362, 150, 142
See application file for complete search history.

(56) References Cited

U.S. PATENT DOCUMENTS

| | | | |
|---|---|---|---|
| 6,298,227 B1 | 10/2001 | Molnar | |
| 8,477,892 B2 * | 7/2013 | Hiben ................. | H04W 56/005 |
| | | | 370/320 |
| 2005/0085203 A1 * | 4/2005 | Suganuma ........... | H04B 1/1661 |
| | | | 455/188.1 |
| 2005/0213645 A1 * | 9/2005 | Nishimura ........... | H04B 1/7075 |
| | | | 375/150 |
| 2009/0129520 A1 * | 5/2009 | Yamamoto ............. | H04B 1/123 |
| | | | 375/343 |
| 2011/0039509 A1 * | 2/2011 | Bruchner ................. | H04B 1/40 |
| | | | 327/155 |
| 2011/0075774 A1 * | 3/2011 | Hiben .............. | H04L 25/03006 |
| | | | 375/350 |

* cited by examiner

FREQUENCY

- - - - - - - - -    −1 kHz SHIFTED FILTER

- - - - -    −500 Hz SHIFTED FILTER

————————    0 Hz SHIFTED FILTER

—·—·—    +500 Hz SHIFTED FILTER

—··—··—    +1 kHz SHIFTED FILTER

FREQUENCY DEVIATION

FREQUENCY

——————— 0 Hz SHIFTED FILTER

— — — — —  RECEIVED SIGNAL WITH
           FREQUENCY DEVIATION o : SYMBOL POINT o : ORIGINAL SYMBOL POINT

0x1800    +3

0x0800    +1
CENTER    0
0xF800    −1

0xE800    −3

⊘ : ORIGINAL SYMBOL POINT

SYNCHRONIZATION DETECTION APPARATUS, SYNCHRONIZATION DETECTION METHOD, AND NON-TRANSITORY COMPUTER READABLE MEDIUM

CROSS REFERENCE TO RELATED APPLICATION

This application is based upon and claims the benefit of priority from International Patent Application No. PCT/JP2023/019367, filed on May 24, 2023, which is based on Japanese Patent Application No. 2022-102550, filed on Jun. 27, 2022, the disclosure of which is incorporated herein in its entirety by reference.

BACKGROUND

The present invention relates to a synchronization detection apparatus, a synchronization detection method, and a synchronization detection program, and in particular to a synchronization detection apparatus, a synchronization detection method, and a synchronization detection program that make it possible to follow, in a short time, a frequency deviation of an intermediate frequency (IF) after a radio frequency is down-converted.

Auto frequency control (AFC) in receiving land mobile radio (LMR) operates to, when converting the frequency of a received signal received by a reception unit (RX) to an intermediate frequency (IF) using a frequency mixer, vary the local (LO) frequency to follow a frequency deviation of the received signal, thereby aligning the output IF signal with the center frequency of the filter. This has been done to obtain an IF signal that is as unaffected as possible from band limitation due to the filter. However, there has been a problem that it takes time to set the local frequency and it takes time to pull the intermediate frequency determined by the receiving frequency and the local frequency into the frequency band of the filter. In addition, since the receiving frequency differs for each terminal that is a communication counterpart, the local frequency must be varied for each terminal accordingly, which also causes a problem that it takes time to set the frequency. Note that the receiving frequency may be referred to as a carrier frequency.

Patent Literature 1 describes that a repeater or a base station detects error information of a signal frequency arriving in the uplink from a radio communication apparatus and transmits the error information in the downlink to the corresponding radio communication apparatus, and the radio communication apparatus corrects its own oscillator frequency based on the error information.

Since the technique described in Patent Literature 1 determines frequency error information in the uplink and notifies it in the downlink, it takes time to follow the frequency.

Patent Literature 2 describes that "A DAC applies digital conversion to an IF signal including an FM-modulated video signal, and an orthogonal modulation unit applies orthogonal modulation to produce components orthogonal to each other and to perform down-conversion to a baseband (BB). A phase calculation unit and a phase difference detection unit are used to carry out FM demodulation processing in this BB. Since digital processing is used, an NCO (numerical control oscillator) can be used as a local oscillator in the orthogonal modulation unit, the adjustment and the setting are facilitated, subcarrier setting in an FM demodulation unit for an audio signal is also facilitated, and filters for subcarrier extraction are easily modified by only varying the filter coefficients."

The technique described in Patent Literature 2 is a system that demodulates a video signal and an audio signal (subcarrier signals) in parallel, and does not disclose that a plurality of IF signals having frequencies slightly shifted from each other are detected and demodulated in parallel.

[Patent Literature 1] Japanese Unexamined Patent Application Publication No. 2008-35132
[Patent Literature 2] Japanese Unexamined Patent Application Publication No. 2007-110269

SUMMARY

As described above, there has been a problem that it takes time to pull the intermediate frequency determined by the receiving frequency and the local frequency into the frequency band of the filter.

Therefore, this embodiment provides a synchronization detection apparatus including:

a band limitation unit in which, for an externally received signal, each of a plurality of filters each having a different center frequency limits a band of the received signal to output a plurality of band-limited signals;

a detection and demodulation unit that detects and demodulates each of the plurality of band-limited signals to output a plurality of detected signals;

a synchronization detection unit that performs synchronization detection of each of the plurality of detected signals to output a plurality of correlation values; and a synchronization evaluation unit that selects a predetermined filter from among the plurality of filters based on the plurality of correlation values.

In addition, this embodiment provides a synchronization detection method including:

for an externally received signal, each of a plurality of filters each having a different center frequency limiting a band of the received signal to output a plurality of band-limited signals;

detecting and demodulating each of the plurality of band-limited signals to output a plurality of detected signals;

performing synchronization detection of each of the plurality of detected signals to output a plurality of correlation values; and selecting a predetermined filter from among the plurality of filters based on the plurality of correlation values.

In addition, this embodiment provides a synchronization detection program causing a computer to execute:

for an externally received signal, each of a plurality of filters each having a different center frequency limiting a band of the received signal to output a plurality of band-limited signals;

detecting and demodulating each of the plurality of band-limited signals to output a plurality of detected signals;

performing synchronization detection of each of the plurality of detected signals to output a plurality of correlation values; and selecting a predetermined filter from among the plurality of filters based on the plurality of correlation values.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Embodiment

Figure 1:
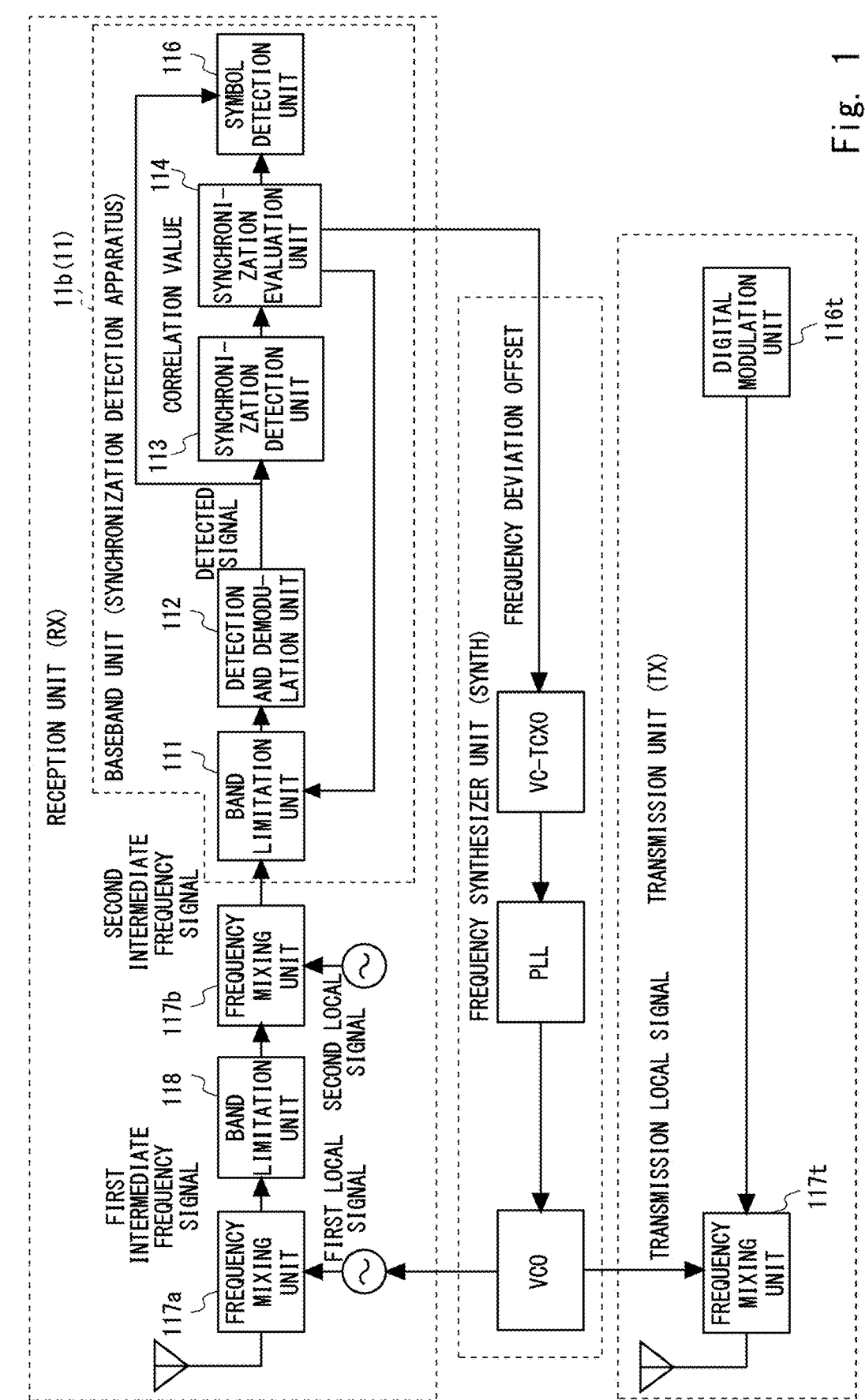
FIG. 1 is a block diagram illustrating a radio communication apparatus according to an embodiment.

FIG. 1 is a block diagram illustrating a radio communication apparatus according to an embodiment.

As shown in FIG. 1, a radio communication apparatus 10 according to an embodiment includes a reception unit (RX), a frequency synthesizer unit (SYNTH), and a transmission unit (TX). The frequency synthesizer unit includes a voltage controlled-temperature compensated crystal oscillator (VC-TCXO), a phase locked loop (PLL), and a voltage controlled oscillator (VCO). The frequency synthesizer unit uses them to supply a source signal for supplying a first local signal to a frequency mixing unit 117a of the reception unit. The frequency synthesizer unit also supplies a transmission local signal to a frequency mixing unit 117t of the transmission unit.

The transmission unit includes a digital modulation unit 116t and the frequency mixing unit 117t. The digital modulation unit 116t outputs a modulated signal obtained by modulating data to be transmitted or the like to the frequency mixing unit 117t. The frequency mixing unit 117t transmits a radio signal obtained by up-converting (converting) the modulated signal in the baseband to a radio frequency to an external terminal via an antenna.

The reception unit includes the frequency mixing unit 117a, a band limitation unit 118, a frequency mixing unit 117b, and a baseband unit 11b. The frequency mixing unit 117a down-converts (converts) a radio signal received via an antenna using the first local signal to output a first intermediate frequency signal (a 1st IF signal). The band limitation unit 118 applies band limitation to the first intermediate frequency signal. The frequency mixing unit 117b down-converts the band-limited first intermediate frequency signal using a second local signal to output a second intermediate frequency signal (a 2nd IF signal).

The baseband unit 11b can also be operated by itself as a synchronization detection apparatus 11. Therefore, the baseband unit 11b will hereinafter be described as the synchronization detection apparatus 11, which is a standalone apparatus of the baseband unit 11b. The synchronization detection apparatus 11 (the baseband unit 11b) includes a band limitation unit 111, a detection and demodulation unit 112, a synchronization detection unit 113, a synchronization evaluation unit 114, and a symbol detection unit 116. Each unit of the synchronization detection apparatus 11 will be described in detail later.

Figure 2:
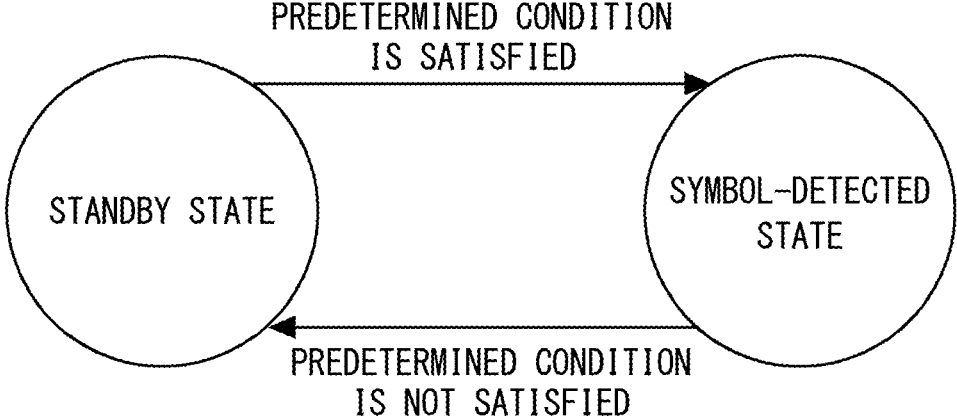
FIG. 2 is a state transition diagram illustrating state transitions of a synchronization detection apparatus according to the embodiment.

FIG. 2 is a state transition diagram illustrating state transitions of the synchronization detection apparatus according to the embodiment.

As shown in FIG. 2, the synchronization detection apparatus 11 has two states: a standby state and a symbol-detected state. The synchronization detection apparatus 11 makes a transition to the symbol-detected state when a predetermined condition is satisfied, and makes a transition to the standby state when the predetermined condition is not satisfied. When the predetermined condition is satisfied, for example, when any of a plurality of correlation values output by the synchronization detection unit 113 is equal to or greater than a predetermined threshold, the synchronization detection apparatus 11 makes a transition (shifts) to the symbol-detected state. When the predetermined condition is not satisfied, for example, when all of the plurality of correlation values are less than the predetermined threshold, the synchronization detection apparatus 11 (the band limitation unit 111, the detection and demodulation unit 112, the synchronization detection unit 113, and the synchronization evaluation unit 114) makes a transition to the standby state in which synchronization detection is repeated. Furthermore, in the symbol-detected state, the synchronization detection apparatus 11 selects a predetermined filter described later.

Note that the state in which any of the plurality of correlation values is equal to or greater than the predetermined threshold may be referred to as a synchronization-detected state. Furthermore, the state in which all of the plurality of correlation values are less than the predetermined threshold may be referred to as a state in which out-of-synchronization has occurred.

<Standby State>

Operation of the synchronization detection apparatus in the standby state will now be described.

Figure 3:
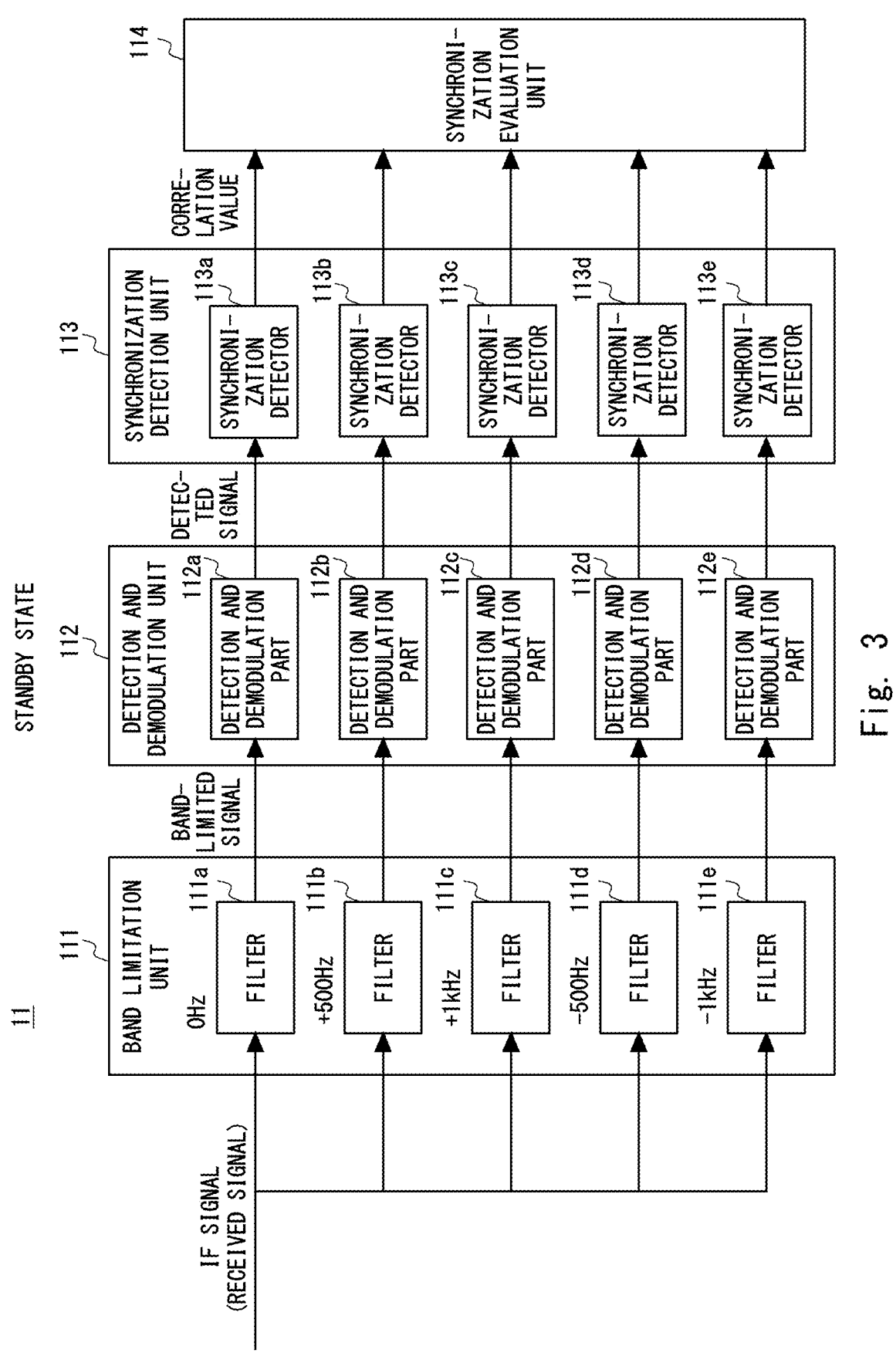
FIG. 3 is a block diagram illustrating a synchronization detection apparatus according to the embodiment.

FIG. 3 is a block diagram illustrating the synchronization detection apparatus according to the embodiment.

FIG. 3 is a block diagram illustrating the synchronization detection apparatus in the standby state.

In FIG. 3, the band limitation unit 111x, the detection and demodulation unit 112x, and the synchronization detection unit 113x are regarded as one system, and an example in which five such systems are provided will be described. Here, x is any one of a, b, c, d, and e.

Figure 4:
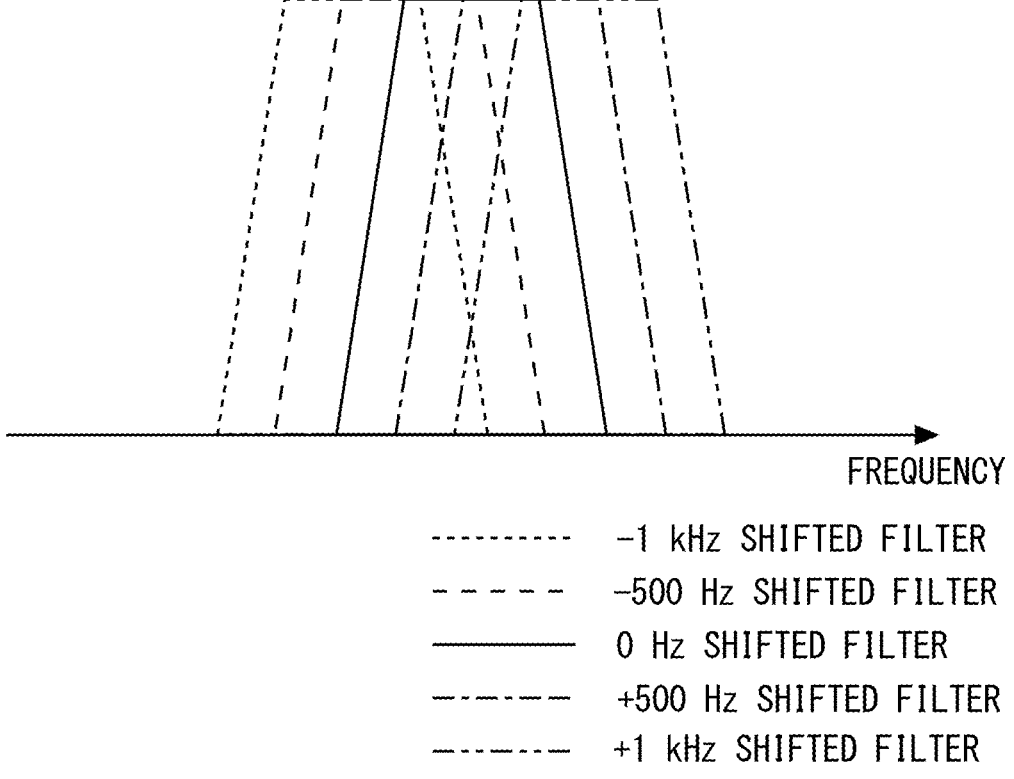
FIG. 4 is a schematic diagram illustrating the frequency band characteristics of filters according to the embodiment.

FIG. 4 is a schematic diagram illustrating the frequency band characteristics of filters according to the embodiment.

The horizontal axis in FIG. 4 represents frequency.

As shown in FIG. 3, the synchronization detection apparatus 11 includes the band limitation unit 111, the detection and demodulation unit 112, the synchronization detection unit 113, the synchronization evaluation unit 114, and the symbol detection unit. The synchronization detection unit may be referred to as a SYNC detection unit, and the synchronization evaluation unit may be referred to as a SYNC evaluation unit.

In the band limitation unit 111, for example, for a received signal (a radio signal) from an external terminal, each of a plurality of filters 111a to 111e having different center frequencies limits the band of the received signal to output a plurality of band-limited signals. For example, the band limitation unit 111 is composed of a plurality of parallelly arranged filters having frequency band characteristics as shown in FIG. 4 and having center frequencies slightly shifted from each other. The band limitation unit 111 limits the band of the received signal in each of the plurality of filters. FIG. 3 shows an example of a filter configuration of the band limitation unit 111 in which five narrow-band filters having center frequencies shifted from each other by 500 Hz (Hertz) are arranged in line. That is, in FIG. 3, the band limitation unit 111 sets the center frequency to 0 Hz, and includes a filter 111c centered thereon, a −1 kHz shifted filter 111e, a −500 Hz shifted filter 111d, a +500 Hz shifted filter 111b, and a +1 kHz shifted filter 111a.

Note that, for example, ACR (adjacent channel rejection) filters or the like are used as the filters. An ACR filter is a band pass filter that suppresses carriers in the frequency bands on both sides adjacent to the pass frequency band. An ACR filter can be realized by a digital filter, and a digital filter is a filter using digital signal processing.

For the ACR filter, the center frequency and the frequency bandwidth can be set by appropriately setting the filter coefficients, and it can be configured to pass (extract) only the target band. Examples of digital filters include FIR (finite impulse response) filters and IIR (infinite impulse response) filters.

The detection and demodulation unit 112 detects and demodulates each of the plurality of band-limited signals to output a plurality of detected signals. Specifically, in the detection and demodulation unit 112, a detector and demodulator 112a detects and demodulates the band-limited signal output from the filter 111a, a detector and demodulator 112b detects and demodulates the band-limited signal output from the filter 111b, a detector and demodulator 112c detects and demodulates the band-limited signal output from the filter 111c, a detector and demodulator 112d detects and demodulates the band-limited signal output from the filter 111d, and a detector and demodulator 112e detects and demodulates the band-limited signal output from the filter 111e.

The synchronization detection unit 113 performs synchronization detection of each of the plurality of detected signals to output a plurality of correlation values. The synchronization detection unit 113 generates a predetermined synchronization signal determined in advance, and performs synchronization detection based on the detected signals and the predetermined synchronization signal to output the correlation values.

Specifically, in the synchronization detection unit 113, a synchronization detector 113a performs synchronization detection of the detected signal output from the detector and demodulator 112a, a synchronization detector 113b performs synchronization detection of the detected signal output from the detector and demodulator 112b, a synchronization detector 113c performs synchronization detection of the detected signal output from the detector and demodulator 112c, a synchronization detector 113d performs synchronization detection of the detected signal output from the detector and demodulator 112d, a synchronization detector 113e performs synchronization detection of the detected signal output from the detector and demodulator 112e, and each of them outputs the correlation value to the synchronization evaluation unit 114. The correlation value may be referred to as a symbol correlation value.

Figure 5:
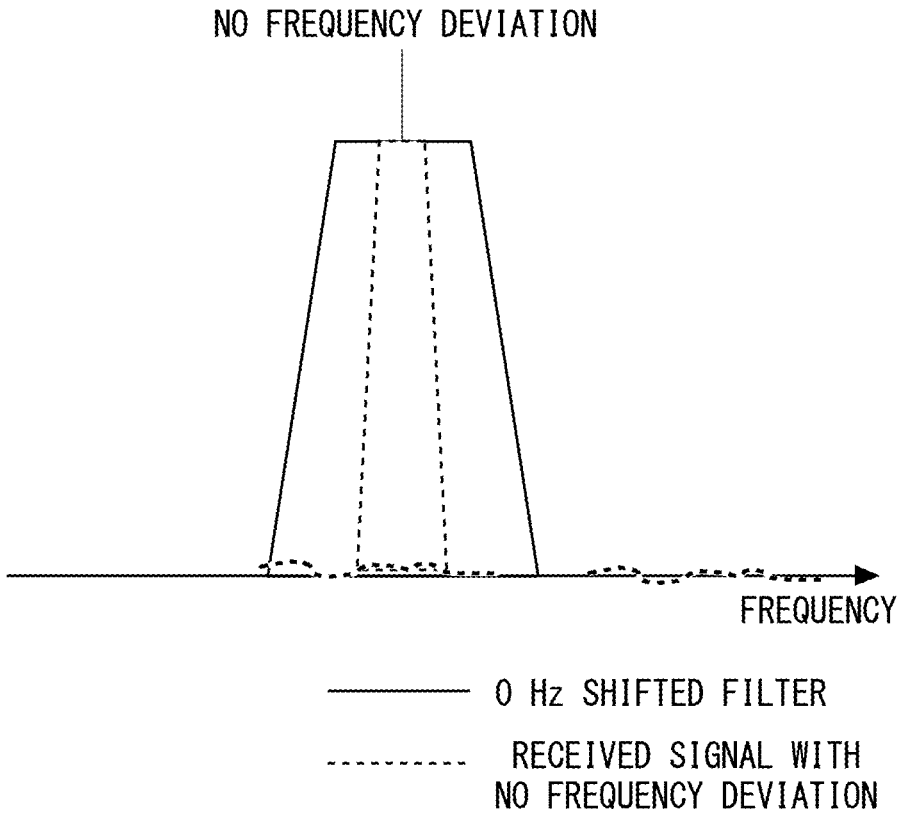
FIG. 5 is a schematic diagram illustrating the frequency band characteristics of a received signal and a filter.

FIG. 5 is a schematic diagram illustrating the frequency band characteristics of a received signal and a filter.

The horizontal axis in FIG. 5 represents frequency. FIG. 5 shows the frequency band characteristics when there is no deviation between the center frequency of the filter and the center frequency of the received signal (IF signal).

Figure 6:
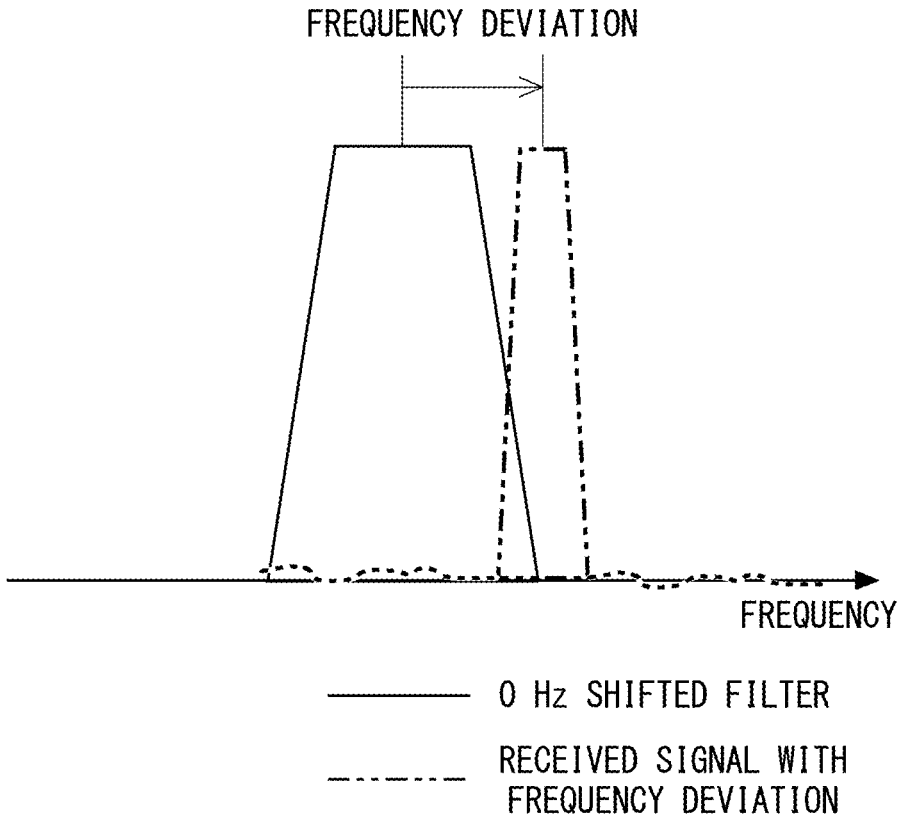
FIG. 6 is a schematic diagram illustrating the frequency band characteristics of a received signal and the filter.

FIG. 6 is a schematic diagram illustrating the frequency band characteristics of a received signal and the filter.

The horizontal axis in FIG. 6 represents frequency. FIG. 6 shows the frequency band characteristics when there is a deviation between the center frequency of the filter and the center frequency of the received signal (IF signal).

As shown in FIG. 5, when there is no deviation between the center frequency of the filter and the center frequency of the received signal (in the case of a received signal with no frequency deviation), the received signal is not subject to unnecessary band limitation. Since the received signal is not subject to unnecessary band limitation when there is no frequency deviation, the correlation value obtained through synchronization detection by the synchronization detection unit 113 is higher than the correlation value when there is a frequency deviation.

As shown in FIG. 6, when there is a deviation between the center frequency of the filter and the center frequency of the received signal (in the case of a received signal with a frequency deviation), the received signal is subject to unnecessary band limitation. Since the received signal is subjected to unnecessary band limitation when there is a frequency deviation, the correlation value obtained through synchronization detection by the synchronization detection unit 113 becomes lower than the correlation value when there is no frequency deviation.

The synchronization evaluation unit 114 selects a predetermined filter 111p from among the plurality of filters 111a to 111e based on the plurality of correlation values. In the standby state, the synchronization evaluation unit 114 determines and selects a predetermined filter 111p corresponding to the symbol correlation value that gives the largest correlation value level determined from the detected signal from among the plurality of filters 111a to 111e. By using the predetermined filter 111p, the received signal can be received in the best condition. In other words, the synchronization evaluation unit 114 selects a first correlation value that is the highest correlation value from among the plurality of correlation values, and selects a predetermined filter 111p corresponding to the first correlation value from among the plurality of filters 111a to 111e. As a result, the band limitation unit 111 outputs a predetermined band-limited signal using the predetermined filter 111p.

Here, operation of the synchronization detection unit 113 will be described. Specifically, a calculation example of a symbol correlation value will be described.

In this example, it is assumed that synchronization detection is performed for each symbol period, and a correlation value is calculated for the detected signal at each symbol interval using the synchronization symbol values. Each parameter is defined as follows:

N: The number of samples in one symbol period

M: The number of synchronization symbols (the number of symbols for synchronization)

Rnm: A detected signal (detected data) for reception that is a target for synchronization detection A sample position in one symbol n=1, 2, . . . N A synchronization symbol position m=1, 2, . . . M SYNCm: The synchronization symbol value at a synchronization symbol position m Cn: The calculation result of the correlation value for each symbol sample (C1, C2, . . . CN)

When each parameter is defined as above, the calculation result Cn of the correlation value is:

$$Cn = \Sigma Rnm * SYNCm(n = 1, 2, \ldots N, m = 1, 2, \ldots M).$$

Here, the time when the value of Cn increases and reaches the predetermined threshold or more is determined as the synchronization signal timing (the timing when synchronization is established).

Figure 7:
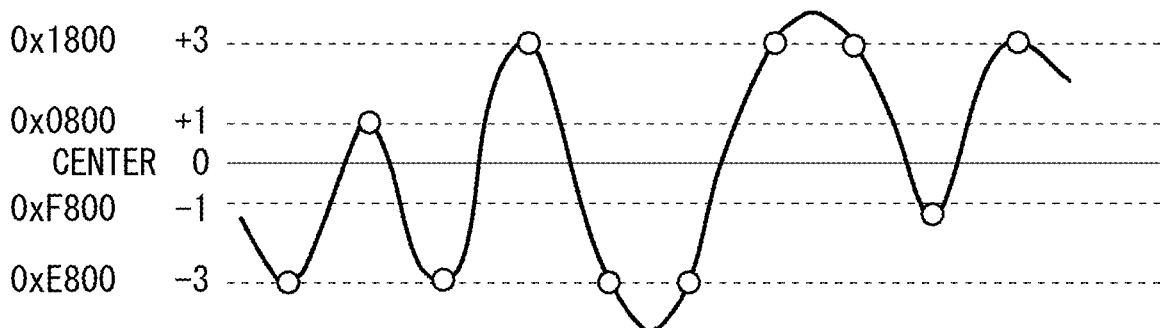
FIG. 7 is a schematic diagram illustrating a detected waveform of synchronization symbols.

FIG. 7 is a schematic diagram illustrating a detected waveform of synchronization symbols.

The horizontal axis in FIG. 7 represents time. FIG. 7 shows a detection result of synchronization symbols.

FIG. 7 shows an example of a detected waveform of synchronization symbols (detected signal) for 10 symbols (−3, +1, −3, +3, −3, −3, +3, +3, −1, +3). However, shown is the case where a detected signal has a four-value symbol.

FIG. 7 shows an example of a detected waveform when there is no frequency deviation and symbol detection of synchronization symbols can be performed without any problem. The synchronization symbols may be referred to as a synchronization signal or SYNC data. A detected waveform may be referred to as a detected signal.

Figure 8:
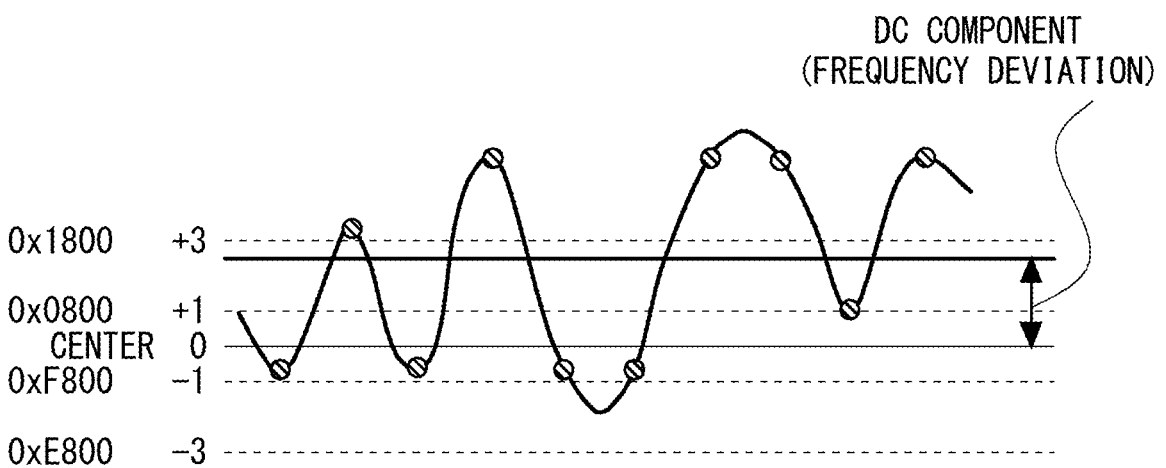
FIG. 8 is a schematic diagram illustrating a detected waveform of synchronization symbols.

FIG. 8 is a schematic diagram illustrating a detected waveform of synchronization symbols.

The horizontal axis in FIG. 8 represents time. FIG. 8 shows a detection result of synchronization symbols.

FIG. 8 shows an example of a detected waveform when symbol detection of synchronization symbols cannot be performed properly due to a frequency deviation.

Figure 9:
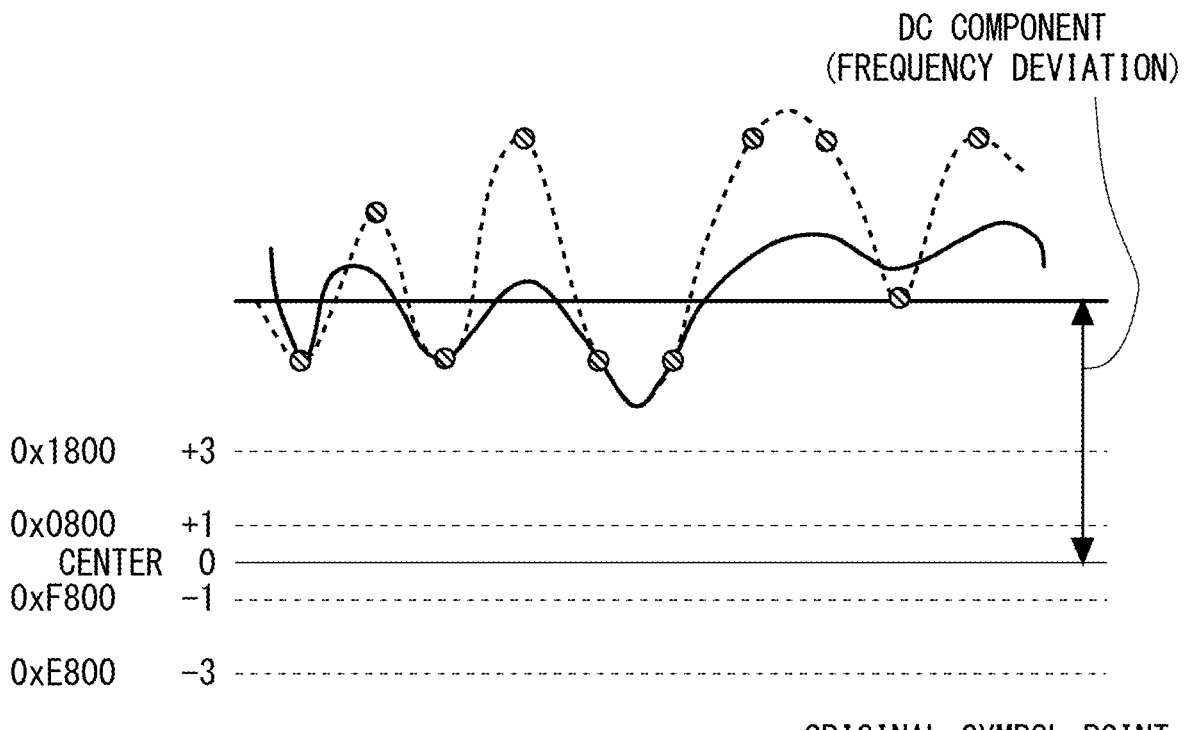
FIG. 9 is a schematic diagram illustrating a detected waveform of synchronization symbols.

FIG. 9 is a schematic diagram illustrating a detected waveform of synchronization symbols.

The horizontal axis in FIG. 9 represents time. FIG. 9 shows a detection result of synchronization symbols.

FIG. 9 shows an example of a detected waveform when the frequency of the synchronization symbols (synchronization signal) falls outside the band of the filter due to a frequency deviation even larger than the frequency deviation shown in FIG. 8, and the detected waveform degrades, thus making symbol detection (determination) impossible. The detected waveform deviates from the four-value symbol values.

As shown in FIGS. 7 to 9, as the center frequency of the synchronization symbols (synchronization signal) deviates from the center frequency of the filter, the accuracy of detecting the symbol values of the synchronization symbols deteriorates. As shown in FIGS. 8 and 9, when the frequency deviation is large, the detected waveform of the synchronization symbols is distorted, so that the correlation value remains small even at the synchronization timing, thus making symbol detection (synchronization detection) impossible.

<Symbol-Detected State>

When the correlation value is equal to or greater than the predetermined threshold, the synchronization detection apparatus 11 makes a transition to the synchronization-detected state, that is, the symbol-detected state (see FIG. 2). For example, when any of the plurality of correlation values is equal to or greater than the predetermined threshold, a transition is made to the symbol-detected state.

Operation of the synchronization detection apparatus in the symbol-detected state will now be described.

Figure 10:
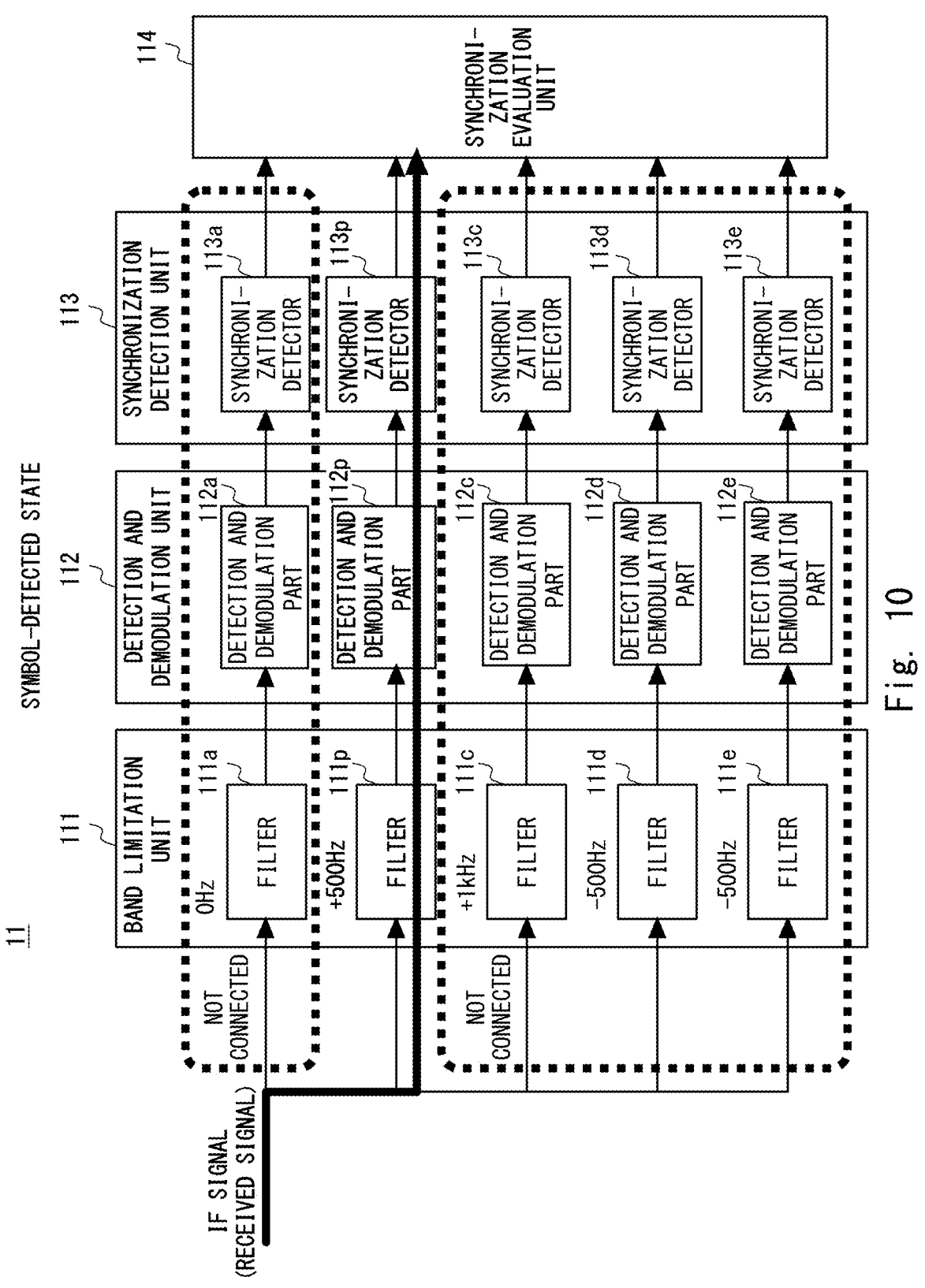
FIG. 10 is a block diagram illustrating the synchronization detection apparatus according to the embodiment.

FIG. 10 is a block diagram illustrating the synchronization detection apparatus according to the embodiment.

Figure 11:
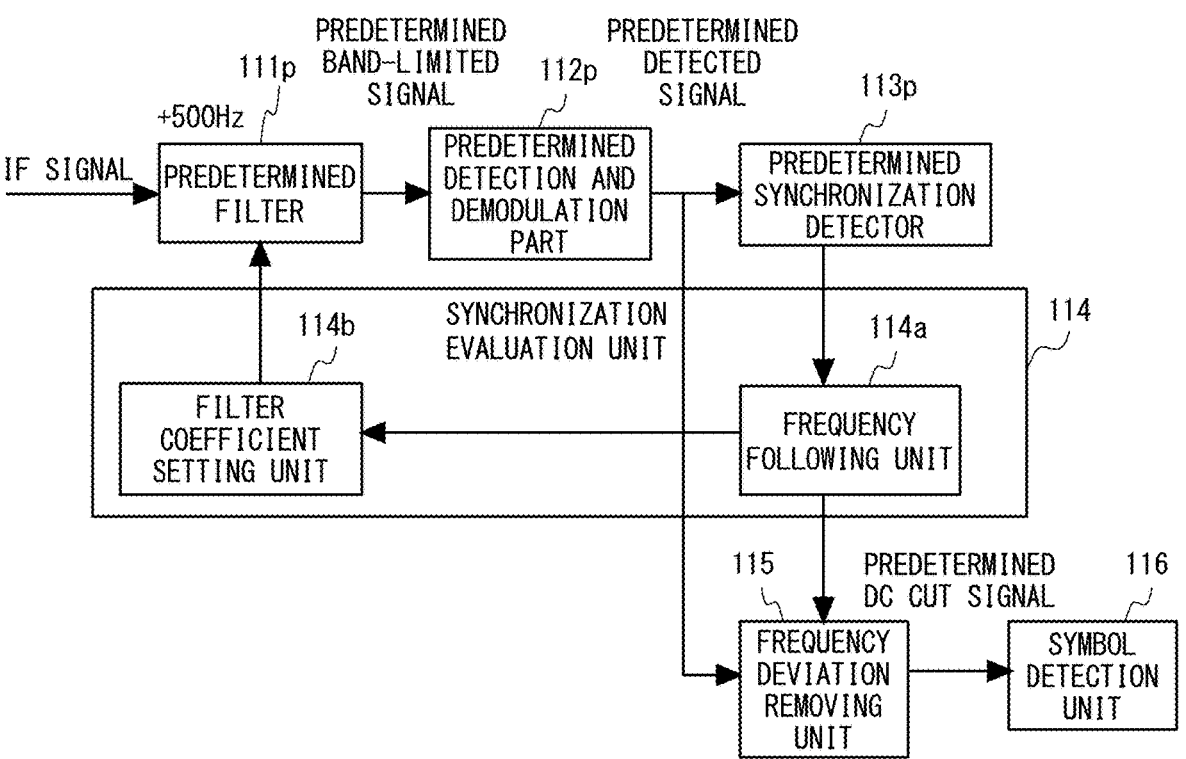
FIG. 11 is a block diagram illustrating the synchronization detection apparatus according to the embodiment.

FIG. 11 is a block diagram illustrating the synchronization detection apparatus according to the embodiment.

FIGS. 10 and 11 show the synchronization detection apparatus in the symbol-detected state.

FIGS. 10 and 11 show a case where the synchronization evaluation unit 114 selects the +500 Hz shifted filter 111b as a predetermined filter 111p.

As shown in FIG. 10, when a transition is made to the symbol-detected state, the synchronization evaluation unit 114 selects a first correlation value that is the highest correlation value from among the plurality of correlation values. Furthermore, the synchronization evaluation unit 114 selects a predetermined filter 111p corresponding to the first correlation value from among the plurality of filters 111a to 111e. As a result, the synchronization detection apparatus 11 continues to receive an IF signal (received signal) using only the path composed of the predetermined filter 111p, the predetermined detector and demodulator 112p, and the predetermined synchronization detector 113p. The synchronization detection apparatus 11 leaves the paths other than the selected one (the paths composed of the filter, the detector and demodulator, and the synchronization detector) unconnected.

As shown in FIG. 11, in the symbol-detected state, the predetermined detector and demodulator 112p of the detection and demodulation unit 112 detects and demodulates a predetermined band-limited signal to output a predetermined detected signal. Furthermore, in the symbol-detected state, the symbol detection unit 116 of the synchronization detection apparatus 11 detects a symbol from the predetermined detected signal.

In addition, in the symbol-detected state, the synchronization evaluation unit 114 has a filter coefficient setting unit 114b and a frequency tracking unit 114a. The filter coefficient setting unit 114b controls the center frequency of the predetermined filter 111p by setting the filter coefficients of the predetermined filter 111p. The frequency tracking unit 114a adjusts the correlation value of the predetermined filter 111p to the highest correlation value by controlling the center frequency of the predetermined filter 111p.

In other words, the frequency tracking unit 114a detects a frequency deviation value and notifies it to the filter coefficient setting unit 114b in order to adjust the center frequency of the predetermined filter 111p to the center frequency determined by itself. The center frequency of the filter can be controlled by converting the frequency deviation value into complex coefficients and setting the filter coefficients. In order to achieve the desired center frequency, the filter coefficient setting unit 114b performs complex coefficient conversion based on the frequency deviation value, calculates the filter coefficients, and updates the filter coefficients of the predetermined filter 111p. The filter coefficient setting unit may be referred to as a complex coefficient conversion unit. However, the calculation of the filter coefficients is not limited to complex coefficient conversion, and other methods may be used.

Furthermore, the predetermined synchronization detector 113p of the synchronization detection unit 113 determines a DC component value (a frequency deviation value) based on the symbol values at the time of synchronization detection (see FIGS. 8 and 9).

The synchronization detection apparatus 11 also includes a frequency deviation removing unit 115. The frequency deviation removing unit 115 uses the DC component value (the frequency deviation value) determined by the synchronization detection unit 113 to output a predetermined DC cut signal (a predetermined frequency deviation corrected signal) obtained by cutting the DC component value from the predetermined detected signal to the symbol detection unit 116.

The symbol detection unit 116 detects a symbol from the predetermined DC cut signal (the predetermined frequency deviation corrected signal).

Figure 12:
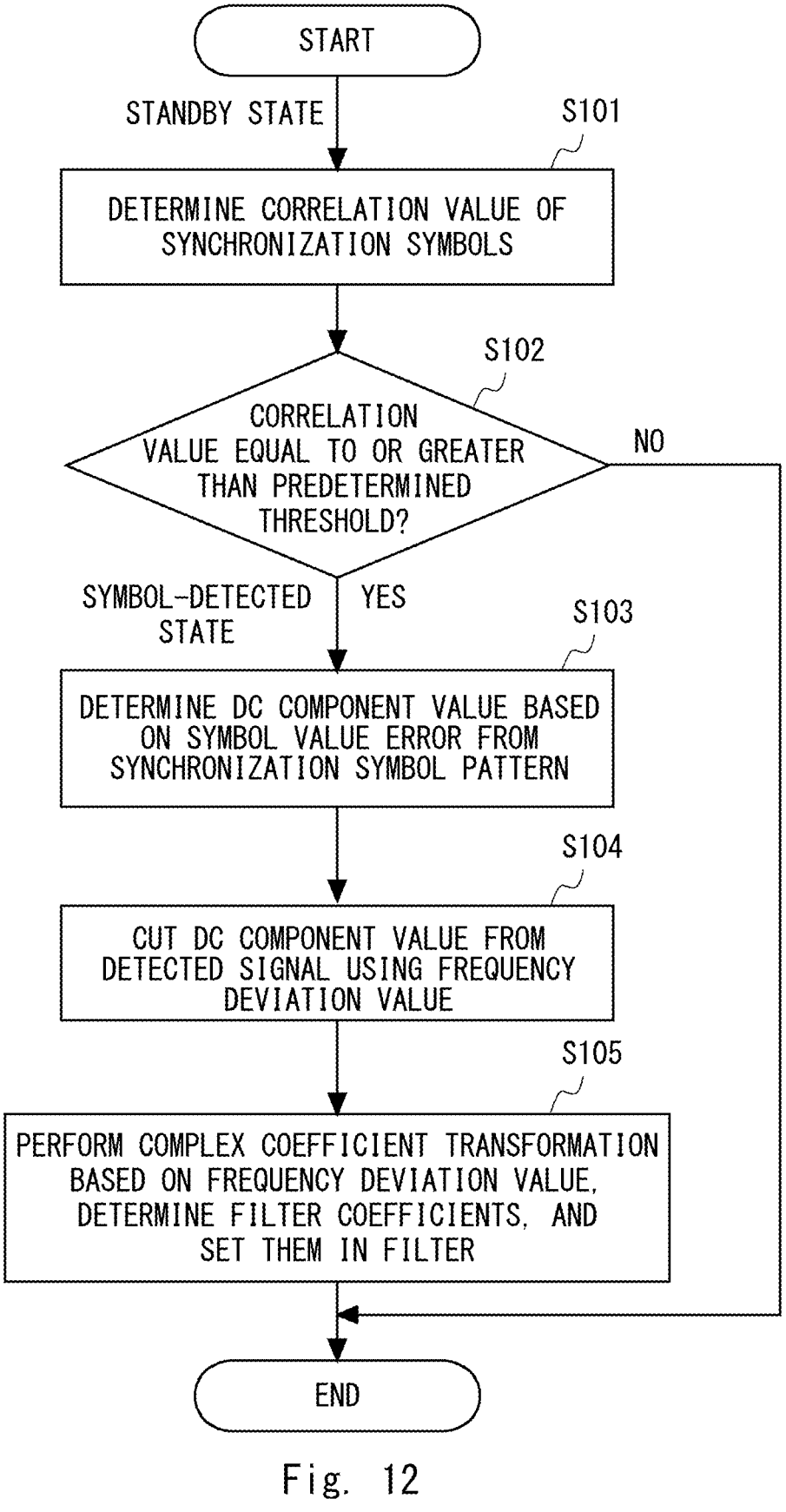
FIG. 12 is a flowchart illustrating operation of the synchronization detection apparatus according to the embodiment.

FIG. 12 is a flowchart illustrating operation of the synchronization detection apparatus according to the embodiment.

FIG. 12 shows an operational flow in the standby state and the symbol-detected state.

As shown in FIG. 12, the synchronization detection unit 113 determines a correlation value of synchronization symbols in the standby state (step S101).

When the correlation value is equal to or greater than the predetermined threshold (step S102: Yes), the synchronization evaluation unit 114 makes a transition to the symbol-detected state and selects a predetermined filter 111*p* corresponding to the first correlation value.

When the correlation value is less than the predetermined threshold (step S102: No), the synchronization evaluation unit 114 ends the symbol-detected state. In this case, it may return to the standby state. For example, it enters the standby state when all of the plurality of correlation values are less than the predetermined threshold.

In the symbol-detected state, the synchronization detection unit 113 determines a DC component value, that is, a frequency deviation value based on a symbol value error between the detected signal and a predetermined synchronization signal determined in advance (a synchronization symbol pattern) (step S103).

The frequency deviation removing unit 115 cuts (removes) the DC component value from the predetermined detected signal using the frequency deviation value (step S104).

The filter coefficient setting unit 114*b* performs complex coefficient conversion based on the frequency deviation value, determines filter coefficients, and sets the filter coefficients for the predetermined filter 111*p* (step S105).

By performing the operations from step S101 to step S105 to follow the frequency deviation with high accuracy, it is possible to make the center frequency of the predetermined filter 111*p* follow the center frequency of the IF signal.

<Effects>

Even when the center frequency of the IF signal (received signal) is outside the band of one filter (when there is a frequency deviation), the synchronization detection apparatus 11 according to the embodiment waits for the IF signal in a state where a plurality of filters with different center frequencies are arranged and selects the optimal filter. This makes it possible to shorten the time required to pull an IF signal having a frequency deviation into the band of the filter.

As a result, it is possible to provide a synchronization detection apparatus, a synchronization detection method, and a synchronization detection program that make it possible to follow, in a short time, a frequency deviation of an intermediate frequency (IF) after a radio frequency is down-converted. According to the embodiment, the synchronization symbols can be detected instantly.

Furthermore, according to the embodiment, since the frequency deviation of the IF signal (received signal) is followed by setting the filter coefficients to control the center frequency of the filter, there is no need to switch the frequency of the local signal (the local oscillator). This makes it possible to simplify the circuit configuration of the receiving system.

<Features>

The features of the present invention will now be described below.

The present invention relates to auto frequency control processing at the time of reception (demodulation) in a radio communication apparatus (a synchronization detection apparatus).

In order to follow a deviation of the center frequency of the IF signal, a configuration is provided in which a plurality of filters having center frequencies slightly shifted from each other are arranged in parallel in the baseband.

By setting the filter coefficients, the center frequency of the filter is controlled, thereby tracking the frequency deviation.

Note that some or all of the above processes may be executed by a computer program. The above-described program can be stored and supplied to a computer using various types of non-transitory computer readable media. Non-transitory computer readable media include various types of tangible storage media. Examples of non-transitory computer-readable media include a magnetic recording medium (e.g., a flexible disk, a magnetic tape, and a hard disk drive), a magneto-optical recording medium (e.g., a magneto-optical disk), CD-ROM (Read Only Memory), CD-R, CD-R/W, and a semiconductor memory (e.g., a mask ROM, a PROM (Programmable ROM), an EPROM (Erasable PROM), a flash ROM, a RAM (Random Access Memory)). The program may also be provided to the computer by various types of transitory computer readable media. Examples of transitory computer readable media include electrical signals, optical signals, and electromagnetic waves. A transitory computer readable medium can supply the program to a computer via a wired communication path such as an electric wire or an optical fiber or a wireless communication path.

The invention has been specifically described above based on the embodiment, but it goes without saying that the present invention is not limited to the above embodiment and can be modified in various ways without departing from the spirit thereof.

The present invention is applicable to a synchronization detection apparatus, a synchronization detection method, and a synchronization detection program, and therefore has industrial applicability.

According to this embodiment, it is possible to provide a synchronization detection apparatus, a synchronization detection method, and a synchronization detection program that make it possible to follow, in a short time, a frequency deviation of an intermediate frequency (IF) after a radio frequency is down-converted.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that. Applicant's intent is to encompass equivalents of all claim elements, even if amended later during prosecution.

What is claimed is:

1. A synchronization detection apparatus comprising:
   a band limitation unit in which, for an externally received signal, each of a plurality of filters each having a different center frequency limits a band of the received signal to output a plurality of band-limited signals;

a detection and demodulation unit that detects and demodulates each of the plurality of band-limited signals to output a plurality of detected signals;

a synchronization detection unit that performs synchronization detection of each of the plurality of detected signals to output a plurality of correlation values; and a synchronization evaluation unit that selects a predetermined filter from among the plurality of filters based on the plurality of correlation values, wherein the synchronization evaluation unit includes a frequency tracking unit and a filter coefficient setting unit that set the center frequency of the filter based on the correlation values, the synchronization evaluation unit selects the highest correlation value among the plurality of correlation values as a first correlation value, and when the predetermined filter corresponding to the first correlation value is selected from among the plurality of filters, the frequency tracking unit detects a frequency deviation value of the selected predetermined filter, and the filter coefficient setting unit updates the center frequency of the predetermined filter based on the frequency deviation value, and the band limitation unit outputs a predetermined band-limited signal using the updated predetermined filter.

2. The synchronization detection apparatus according to claim 1, wherein the band limitation unit, the detection and demodulation unit, the synchronization detection unit, and the synchronization evaluation unit make a transition to a standby state in which the synchronization detection is repeated when all of the plurality of correlation values are less than a predetermined threshold, and make a transition to a symbol-detected state in which the predetermined filter is selected when any of the plurality of correlation values is equal to or greater than the predetermined threshold.

3. A synchronization detection method comprising:

for an externally received signal, each of a plurality of filters each having a different center frequency limiting a band of the received signal to output a plurality of band-limited signals;

detecting and demodulating each of the plurality of band-limited signals to output a plurality of detected signals;

performing synchronization detection of each of the plurality of detected signals to output a plurality of correlation values;

selecting a predetermined filter from among the plurality of filters based on the plurality of correlation values;

setting the center frequency of the filter based on the correlation values;

selecting the highest correlation value among the plurality of correlation values as a first correlation value, and when the predetermined filter corresponding to the first correlation value is selected from among the plurality of filters, detecting a frequency deviation value of the selected predetermined filter, and updating the center frequency of the predetermined filter based on the frequency deviation value; and outputting a predetermined band-limited signal using the updated predetermined filter.

4. A non-transitory computer readable medium storing a synchronization detection program causing a computer to execute:

for an externally received signal, each of a plurality of filters each having a different center frequency limiting a band of the received signal to output a plurality of band-limited signals;

detecting and demodulating each of the plurality of band-limited signals to output a plurality of detected signals;

performing synchronization detection of each of the plurality of detected signals to output a plurality of correlation values;

selecting a predetermined filter from among the plurality of filters based on the plurality of correlation values;

setting the center frequency of the filter based on the correlation values;

selecting the highest correlation value among the plurality of correlation values as a first correlation value, and when the predetermined filter corresponding to the first correlation value is selected from among the plurality of filters, detecting a frequency deviation value of the selected predetermined filter, and updating the center frequency of the predetermined filter based on the frequency deviation value; and outputting a predetermined band-limited signal using the updated predetermined filter.

* * * * *